Figure 1:
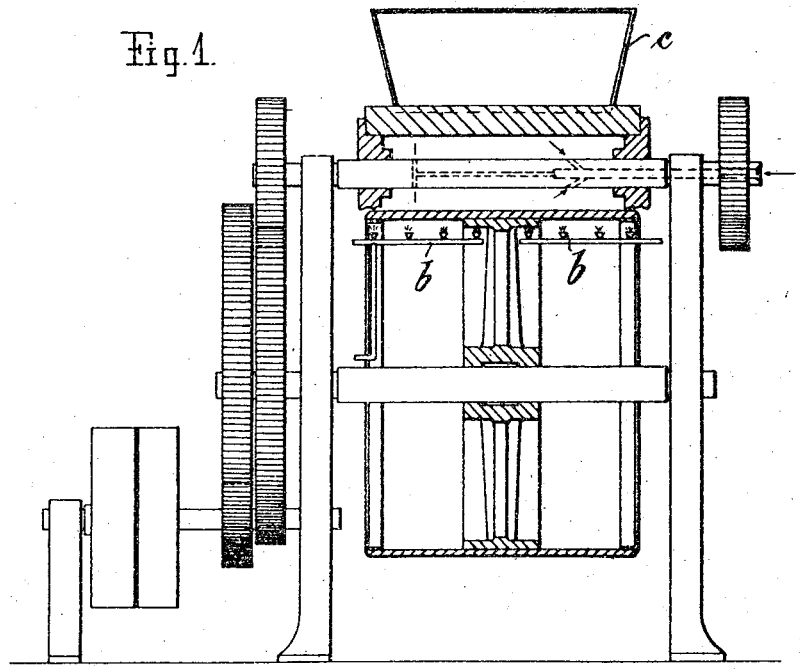

F. E. F. NEUMANN.
METHOD FOR ROASTING COCOA AND CHOCOLATE SUBSTANCES.
APPLICATION FILED MAR. 28, 1913.

1,117,594.

Patented Nov. 17, 1914.

UNITED STATES PATENT OFFICE.

FRIEDRICH ERNST FERDINAND NEUMANN, OF WANDSBEK, NEAR HAMBURG, GERMANY.

METHOD FOR ROASTING COCOA AND CHOCOLATE SUBSTANCES.

1,117,594.  Specification of Letters Patent.  Patented Nov. 17, 1914.

Application filed March 28, 1913. Serial No. 757,410.

*To all whom it may concern:*

Be it known that I, FRIEDRICH ERNST FERDINAND NEUMANN, a subject of the German Emperor, and resident of Wandsbek, near Hamburg, in the German Empire, have invented a new and useful Method for Roasting Cocoa and Chocolate Substances, of which the following is a specification.

As is well known nowadays cocoa beans are no longer roasted but are merely dried. The omission of roasting prevents the full development of the aroma, because the aroma is brought to perfection particularly through the roasting process. This drawback is very clearly perceptible in the finished product and has given rise to numerous systems of treatment. Thus for instance for increasing the aroma in chocolate substances so called conches, longitudinal rubbing machines, beating engines, rotation machines, or hot-air-machines and so on are used, the casings or mantles of which were heated by gas or steam or the like. Hereby the chocolate or cocoa substance was subjected to a lengthy heating process which frequently lasted for many days. This manner of treatment was not only very costly and tedious or wearisome but was prejudicial in that the cocoa butter or fat, during such treatment was in a hot fluid state, which impaired the taste to such degree that one part of the developed aroma was absorbed for balancing the deficiency in the taste, and that by the treatment in the hot air machines the impurities of the air (malodor and dust) gain access to the substances. Moreover in the hot air blast the volatile aroma escapes. Particularly on account of these disadvantages, which are more strongly felt whenever the chocolate or cocoa substances have to be stored up for any length of time, it has been found necessary to fall back on the roasting of the cocoa beans or to subject the peeled cocoa beans or fractures of the beans to a subsequent roasting together with sugar for holding back the volatile aroma. The drawback of the last named subsequent roasting is the temporary superheating which hereby can not be avoided.

The new method which does away with the drawbacks and disadvantages explained above is based on the principle of treating cocoa and chocolate substances in a pasty, roughly ground or granular or even fine liquid state in thin layers. Therefore substances of this description are spread in thin layers on heated, preferably movable surfaces either by allowing the substances to flow on the surfaces or by spreading it by striking, rubbing or rolling them on to the surfaces. After very short time depending on the desired heating effect or taste during which the mass is resting preferably without being subjected to any motion of the air the layer is scraped off or taken off in any other way. Any kind of surfaces can be employed for this purpose either heated movable strips or bands or disks or even rolls can be used which are rotated in any convenient manner. The thickness of the layer may be a fraction of a millimeter and preferably does not surpass more than a few millimeters and the temperature to which the mass is treated should not exceed 130° or 150° centigrade and should not be much under 100° centigrade. The time necessary for allowing the layer to rest on the surface may be calculated in seconds or minutes according to the heat and the thickness of the layer.

Figure 2:
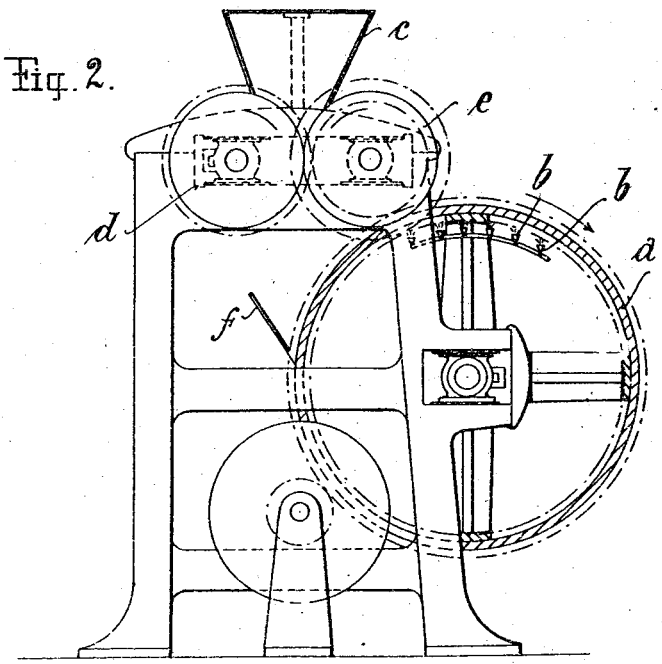

An apparatus that is particularly adapted for carrying out my method is shown in the accompanying drawing in which:

Figure 1 is a front elevation partly in section, and Fig. 2 is a side view of the same partly in section.

In the apparatus shown the movable surface is constituted by a hollow rotatable roll or cylinder $a$, which is rotated by suitable means and heated by a number of gas burners $b$, mounted within the cylinder. The material to be treated is fed from a hopper $c$ between rollers $d$ and $e$ and is rolled down to a thin layer of about 0.1 to 1.0 mm. The roller $e$ is rotated at a greater speed than the roller $d$ and therefore the thin layer adheres to the roller $e$, which carries it to the roll or cylinder $a$ which has a greater surface-speed, than the roller $e$. Therefore, the roll $a$ is supplied with a thin layer of material. The thin layer on the heated cylinder loses its moisture in an extremely short space of time, since the heat does not have to penetrate any mass of considerable thickness to get to the surface. The dried or roasted mass is removed from the roll $a$ by means of a scraper $f$. Should it be desired or preferred the mass may be led through the apparatus repeatedly to bring small or greater amounts to complete dryness in fractions of minutes or in a space of time calculated in minutes.

This machine is only chosen as an example, since any suitable construction of apparatus may be employed to distribute the substance in a thin layer on a heated surface, from which it is removed after a short space of time.

I claim:

1. The method of roasting cocoa-substances which consists in working cocoa kernels into a pasty or thick fluid state, spreading the substance out in a thin layer on a surface heated to a temperature not over 150° C. and not under 100° C. and removing the substance from said surface after a short space of time.

2. The method of roasting cocoa substances, which consists in working the unroasted substances into a pasty or thick fluid mass, spreading this mass out in thin layers on a suitable surface and then roasting the thin layer by heating it to a temperature of from 100° to 150° C.

3. The method of treating cocoa or chocolate masses in paste form, which comprises spreading the mass in a thin layer onto a moving roasting surface and roasting the mass for a short time, according to the flavor required, during the movement of the thin layer.

FRIEDRICH ERNST FERDINAND NEUMANN.

Witnesses:
MAX F. A. KAEMPFF,
ERNEST H. L. MUMMENHOFF.